(12) United States Patent
Di Tana et al.

(10) Patent No.: US 11,039,708 B2
(45) Date of Patent: Jun. 22, 2021

(54) DISPENSING ASSEMBLY FOR MACHINES FOR THE PREPARATION OF LIQUID FOOD PRODUCTS

(71) Applicants: Luigi Lavazza S.p.A., Turin (IT); Argotec S.r.l., Turin (IT)

(72) Inventors: Valerio Di Tana, Turin (IT); Matias Tarifa, Leiden (NL); Luca Facciolati, Turin (IT)

(73) Assignees: Luigi Lavazza S.p.A., Turin (IT); Argotec S.r.l., Turin (IT)

( * ) Notice: Subject to any disclaimer, the term of this patent is extended or adjusted under 35 U.S.C. 154(b) by 674 days.

(21) Appl. No.: 15/515,020

(22) PCT Filed: Aug. 18, 2015

(86) PCT No.: PCT/IB2015/056279
§ 371 (c)(1),
(2) Date: Mar. 28, 2017

(87) PCT Pub. No.: WO2016/051290
PCT Pub. Date: Apr. 7, 2016

(65) Prior Publication Data
US 2017/0238756 A1    Aug. 24, 2017

(30) Foreign Application Priority Data

Sep. 29, 2014 (IT) .......................... TO2014A000774

(51) Int. Cl.
*A47J 31/46* (2006.01)
*A47J 31/36* (2006.01)
(Continued)

(52) U.S. Cl.
CPC ....... *A47J 31/3623* (2013.01); *A47J 31/4403* (2013.01); *A47J 31/469* (2018.08); *A47J 31/60* (2013.01)

(58) Field of Classification Search
CPC .... A47J 31/3623; A47J 31/4403; A47J 31/46; A47J 31/60
(Continued)

(56) References Cited

U.S. PATENT DOCUMENTS 2,854,917 A * 10/1958 Lafitte ..................... A47J 31/24
99/283
3,295,998 A * 1/1967 Goros ................. A47J 31/3638
99/282
(Continued)

FOREIGN PATENT DOCUMENTS

| CA | 2 557 883 | 12/2004 |
| CN | 1731947 | 2/2006 |

(Continued)

OTHER PUBLICATIONS

International Search Report and Written Opinion of the ISA for PCT/IB2015/056279, dated Nov. 23, 2015, 10 pages.

*Primary Examiner* — Ibrahime A Abraham
*Assistant Examiner* — Frederick F Calvetti
(74) *Attorney, Agent, or Firm* — Nixon & Vanderhye P.C.

(57) ABSTRACT

A dispensing assembly (2) for a machine for the preparation of liquid food products comprises a preparation chamber (7, 8) and a hydraulic circuit (20), which is configured for supplying water and/or steam to the preparation chamber (7, 8). The preparation chamber (7, 8) is configured for receiving at least one dose (9) of a precursor of a liquid food product and for dispensing the liquid food product following upon passage of water and/or steam through the preparation chamber (7, 8). The preparation chamber comprises a first chamber part (7), preferably configured for introducing water and/or steam, and a second chamber part (8), preferably configured for dispensing the liquid food product. At least one chamber part (8) is displaceable with respect to the other chamber part (7) between a spaced-apart position, to enable loading of the aforesaid dose (9) into the preparation chamber, and a close position, to enable introduction of water and/or steam into the preparation chamber and dispensing the liquid food product therefrom. The dispensing assembly (2) further comprises a pneumatic circuit (30)

(Continued)

configured for supplying compressed air to the preparation chamber, in particular when the first chamber part (7) and the second chamber part (8) are in the close position.

17 Claims, 5 Drawing Sheets

(51) Int. Cl.
*A47J 31/60* (2006.01)
*A47J 31/44* (2006.01)

(58) Field of Classification Search
USPC .......... 99/302 R, 302 P, 293, 289 R, 295
See application file for complete search history.

(56) References Cited

U.S. PATENT DOCUMENTS

| | | | | |
|---|---|---|---|---|
| 5,197,373 | A * | 3/1993 | De Jong | A47J 31/043 99/283 |
| 6,019,032 | A * | 2/2000 | Arksey | A47J 31/24 261/DIG. 16 |
| 6,099,878 | A * | 8/2000 | Arksey | A47J 31/24 426/231 |
| 6,607,762 | B2 * | 8/2003 | Lazaris | B65D 85/8043 206/0.5 |
| 6,955,116 | B2 * | 10/2005 | Hale | A47J 31/0673 99/289 R |
| 7,524,019 | B2 * | 4/2009 | Fukasawa | B41J 2/16523 347/34 |
| 7,578,230 | B2 * | 8/2009 | Rahn | A47J 31/465 99/282 |
| 7,640,845 | B2 * | 1/2010 | Woodnorth | A47J 31/46 99/280 |
| 7,677,158 | B2 * | 3/2010 | McDuffie | A47J 31/5255 99/302 R |
| 8,361,527 | B2 * | 1/2013 | Winkler | A47J 31/3695 426/79 |
| 8,609,170 | B2 * | 12/2013 | Tinkler | A47J 31/3676 426/431 |
| 8,661,966 | B2 * | 3/2014 | Stearns | A47J 31/41 426/231 |
| 8,726,789 | B2 * | 5/2014 | Clark | A47J 31/32 426/433 |
| 8,808,775 | B2 * | 8/2014 | Novak | B01F 15/0206 426/394 |
| 8,863,987 | B2 * | 10/2014 | Jacobs | A47J 31/52 222/108 |
| 8,877,276 | B2 * | 11/2014 | Cominelli | A23F 3/18 426/431 |
| 8,960,077 | B2 * | 2/2015 | Doglioni Major | A47J 31/52 99/302 P |
| 8,960,078 | B2 * | 2/2015 | Hristov | A47J 31/0689 99/323 |
| 9,027,463 | B2 * | 5/2015 | Sullivan | A47J 31/58 99/280 |
| 9,295,357 | B2 * | 3/2016 | Tinkler | A47J 31/4492 |
| 9,549,636 | B2 * | 1/2017 | Smith | A47J 31/467 |
| 9,700,171 | B2 * | 7/2017 | Hanneson | A47J 31/3695 |
| 10,136,754 | B2 * | 11/2018 | Smith | A47J 31/0647 |
| 2001/0000145 | A1 * | 4/2001 | Kalenian | B01D 11/0219 426/433 |
| 2004/0056046 | A1 * | 3/2004 | Jones | A47J 31/469 222/129.3 |
| 2004/0118291 | A1 | 6/2004 | Carhuff et al. | |
| 2005/0115597 | A1 * | 6/2005 | Carhuff | G07F 13/06 134/134 |
| 2005/0118707 | A1 * | 6/2005 | Lafferty | G01N 21/0303 435/287.2 |
| 2006/0174769 | A1 * | 8/2006 | Favre | A47J 31/0673 99/275 |
| 2006/0214981 | A1 | 9/2006 | Fukasawa et al. | |
| 2007/0089453 | A1 * | 4/2007 | Shapiro | A47F 3/04 62/434 |
| 2007/0175334 | A1 | 8/2007 | Halliday et al. | |
| 2008/0072766 | A1 * | 3/2008 | Kobylarz | A47J 31/60 99/279 |
| 2009/0158938 | A1 * | 6/2009 | Jarisch | A47J 31/3633 99/289 R |
| 2010/0028495 | A1 * | 2/2010 | Novak | A47J 31/0668 426/77 |
| 2010/0203207 | A1 * | 8/2010 | Clark | A47J 31/32 426/431 |
| 2011/0076361 | A1 * | 3/2011 | Peterson | B65D 85/8043 426/79 |
| 2011/0151075 | A1 * | 6/2011 | Peterson | A47J 31/002 426/238 |
| 2012/0058226 | A1 * | 3/2012 | Winkler | A47J 31/3695 426/79 |
| 2012/0199007 | A1 * | 8/2012 | Larzul | A47J 31/3623 99/281 |
| 2012/0266755 | A1 * | 10/2012 | Baudet | A47J 31/469 99/295 |
| 2013/0022716 | A1 * | 1/2013 | Doglioni Majer | A47J 31/521 426/231 |
| 2013/0104742 | A1 * | 5/2013 | Deo | A47J 31/469 99/275 |
| 2013/0129870 | A1 * | 5/2013 | Novak | B01F 3/04248 426/115 |
| 2013/0129885 | A1 * | 5/2013 | Doglioni Majer | A47J 31/368 426/431 |
| 2013/0218636 | A1 * | 8/2013 | Colson | G06Q 30/0206 705/7.31 |
| 2014/0076170 | A1 * | 3/2014 | Epars | A47J 31/46 99/295 |
| 2014/0272048 | A1 * | 9/2014 | Hristov | A47J 31/446 426/433 |
| 2014/0272076 | A1 * | 9/2014 | Nevin | A47J 31/4407 426/590 |
| 2014/0299000 | A1 * | 10/2014 | Hanneson | A47J 31/369 99/300 |
| 2014/0342068 | A1 * | 11/2014 | Smith | A23F 3/18 426/425 |
| 2015/0027316 | A1 * | 1/2015 | Delbreil | G07F 9/02 99/285 |
| 2015/0102062 | A1 * | 4/2015 | Mosimann | A47J 31/467 222/129.1 |
| 2015/0201789 | A1 * | 7/2015 | Smith | A47J 31/0647 99/295 |
| 2015/0201791 | A1 * | 7/2015 | Tinkler | A23F 3/18 426/431 |
| 2015/0368033 | A1 * | 12/2015 | Krug | A47J 31/407 426/112 |
| 2016/0174756 | A1 * | 6/2016 | Tinkler | A23F 5/262 99/295 |
| 2016/0235242 | A1 * | 8/2016 | McHugh | A47J 31/407 |
| 2017/0233178 | A1 * | 8/2017 | Lo Faro | B65D 85/8043 99/295 |
| 2018/0303275 | A1 * | 10/2018 | Ergican | A23F 5/36 |
| 2018/0352994 | A1 * | 12/2018 | Illy | A47J 31/32 |
| 2019/0082881 | A1 * | 3/2019 | Steber | A47J 31/5251 |
| 2019/0350402 | A1 * | 11/2019 | Steber | A47J 31/52 |

FOREIGN PATENT DOCUMENTS

| | | |
|---|---|---|
| CN | 1761604 | 4/2006 |
| CN | 1861402 | 11/2006 |
| CN | 1942126 | 4/2007 |
| CN | 101692961 | 4/2010 |
| CN | 103619223 | 3/2014 |
| EP | 2 140 787 | 1/2010 |
| WO | WO 2004/065257 | 8/2004 |

* cited by examiner

DISPENSING ASSEMBLY FOR MACHINES FOR THE PREPARATION OF LIQUID FOOD PRODUCTS

This application is the U.S. national phase of International Application No. PCT/IB2015/056279 filed 18 Aug. 2015, which designated the U.S. and claims priority to IT Patent Application No. TO2014A000774 filed 29 Sep. 2014, the entire contents of each of which are hereby incorporated by reference.

FIELD OF THE INVENTION

The present disclosure relates to machines, systems, and methods for the preparation of liquid food products starting from a precursor in the solid form, such as for example ground coffee, and has been developed with particular reference to dispensing assemblies for such machines.

PRIOR ART

Dispensing assemblies of machines of the type indicated above usually comprise a preparation chamber formed in two parts, of which at least one can be displaced with respect to the other between a spaced-apart position, for loading/unloading, and a close position, for injection and dispensing. In the spaced-apart position, in one of the two parts of the preparation chamber there may be set a dose of a precursor of the liquid food product, it being possible for this dose to be contained in a disposable capsule or pod, or else it being possible for it to be set directly in the corresponding part of the preparation chamber.

The two parts of the preparation chamber are then brought into the close position, and injected into the chamber is a pressurized preparation fluid, typically represented by hot water and/or steam. The fluid comes into contact with the dose of precursor to obtain the liquid product by infusion or solubilization, according to the type of precursor. The liquid product comes out of the preparation chamber via a dispensing duct.

In the dispensing assemblies of the type indicated above it is not rare, even following upon dispensing, for liquid residue to remain inside the preparation chamber and/or in the corresponding dispensing duct. The presence of this residue adversely affects the quality of the liquid product dispensed in a subsequent cycle of preparation and implies problems of a hygienic nature, in particular when the preparation machine remains unused for a certain period after dispensing of a liquid product.

OBJECT AND SUMMARY OF THE INVENTION

The main object of the present invention is to overcome the aforesaid drawback in a way that is simple and practical for the user. According to the invention, the above object is achieved thanks to a dispensing assembly for machines for the preparation of liquid food products having the characteristics indicated in Claim 1. The invention moreover regards a machine, a system, and a method for the preparation of liquid food products. Advantageous developments of the invention form the subject of the dependent claims. The claims form an integral part of the technical teaching provided herein in relation to the invention.

BRIEF DESCRIPTION OF THE FIGURES

The invention will now be described with reference to the annexed drawings, which are provided purely by way of non-limiting example and in which.

DETAILED DESCRIPTION

In the ensuing description various specific details are illustrated aimed at providing an in-depth understanding of the embodiments. The embodiments may be obtained without one or more of the specific details, or with other methods, components, materials, etc. In other cases, structures, operations, or materials that are known to or evident for the skilled person are not illustrated or described in detail so that the various aspects of the embodiments will not be obscured. Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like, that may be present in various points of this description do not necessarily refer to one and the same embodiment. Moreover, particular conformations, structures, or characteristics may be combined in any adequate way in one or more embodiments. The references used herein are only provided for convenience and hence do not define the sphere of protection or the scope of the embodiments.

Figure 1:
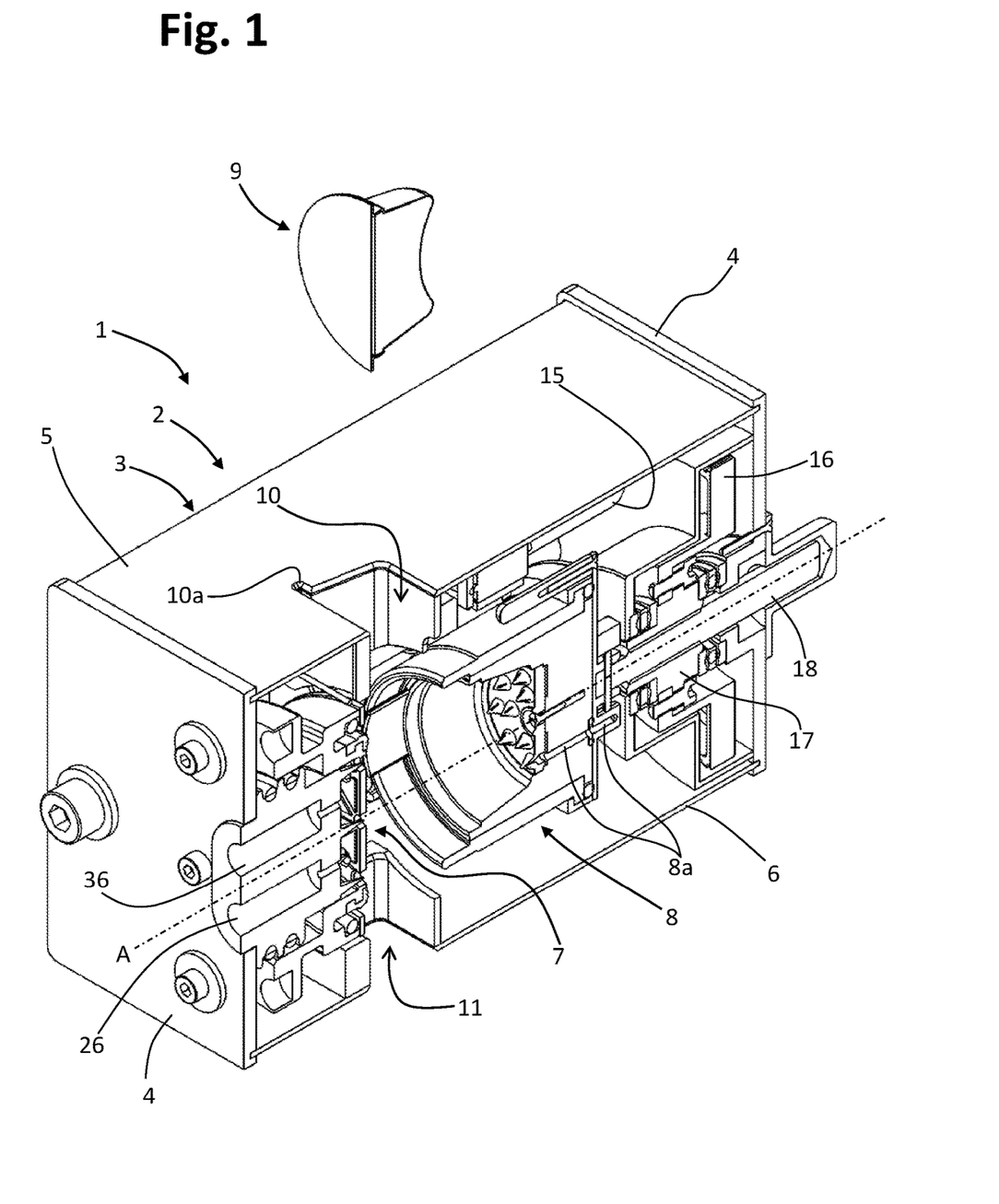
FIG. 1 is a schematic perspective view, in longitudinal section, of a dispensing assembly of a machine for the preparation of liquid products according to one embodiment of the invention.

FIG. 1 represents schematically, and merely by way of non-limiting example, a machine 1 for the preparation of liquid food products, which uses a dispensing assembly according to one embodiment of the invention. The machine 1 is here illustrated limitedly to the parts of immediate interest for an understanding of the invention, such as a dispensing assembly designated as a whole by 2. Hence, the figures do not show other functional components normally provided in a machine of the type considered herein, such as a connector to a water source (for example, a reservoir of the machine), a user interface, an electronic control card, wiring, microswitches, etc.

From a mechanical standpoint, the dispensing assembly 2 may be of any conception known in the sector, for example—but not exclusively—as described in one or more of WO 2014/016741 A2, WO 2013/182923 A1, WO 2013/150480 A1, WO 2013/140282 A1, WO 2013/111088 A1, WO 2013/038318 A1, WO 2012/168917 A1, WO 2012168918 A1 filed in the name of Luigi Lavazza S.p.A., to which the reader is referred also in relation to a description of possible types of capsules (whether sealed or not) that can be used in machines according to the present invention. It should be noted, on the other hand, that the invention may be applied also to machines that use pods made of paper material or else in machines the preparation or infusion chamber of which is conceived for receiving directly a precursor of the liquid product, without mediation of a capsule or a pod, such as, for example, a preparation in granular or powder form, for example ground coffee, or else compacted in the form of a tablet. Moreover, the invention may be applied to dispensing assemblies having a preparation chamber defined by one or more stationary bodies, within which a precursor of the liquid product can be supplied via a suitable passage, which can then be reclosed in a fluid-tight way.

In various embodiments, the dispensing assembly 2 has a supporting structure or casing 3, for example comprising two end plates 4, an upper wall 5, a lower wall 6, and two side walls (not visible). Located inside the casing 3 is a preparation or infusion chamber, configured for receiving at least one dose of a precursor of a liquid food product and for dispensing the product following upon passage of water and/or steam through the preparation chamber.

In one embodiment, the preparation chamber comprises a first part 7 and a second part 8. At least one of the parts 7 and 8 can be displaced with respect to the other part, between a spaced-apart position, to enable loading of the aforesaid dose into the preparation chamber, and a close position, to enable introduction of water and/or steam into the preparation chamber and consequent dispensing of the liquid food product. As has been mentioned, on the other hand, the invention may be applied also to the case of assemblies with a preparation chamber defined by one or more stationary bodies.

In one embodiment, the first part 7 comprises an injector device, referred to hereinafter for simplicity as "injector", designed to introduce into the preparation chamber water and/or steam under pressure, supplied by a corresponding duct via a water source (for example a reservoir), pumping means, and a boiler, which are not represented in FIG. 1. The second part 8 comprises a body, which defines a volume suitable for receiving the aforesaid dose of precursor and is designed to dispense the liquid product obtained by means of the precursor. For this purpose, operatively associated to the part 8 is a dispensing duct, an initial part of which is designated by 8*a* (see also FIG. 4), for release of the liquid product into a collection container, such as a coffee cup.

In a preferred embodiment, such as the one represented, the assembly 2 is of the type pre-arranged for receiving capsules containing the aforesaid dose of precursor. Hence, in this embodiment, the chamber part 8 is a capsule-holder, designed to house at least partially a capsule, such as the capsule designated by 9. In what follows, it is assumed, for simplicity, that the dose of precursor contained in the capsule 9 is ground coffee.

The capsule 9 (also referred to as "cartridge" or "pod") may be of any known type and is hence not described in detail. On the other hand, as mentioned, in possible variant embodiments, the dispensing assembly according to the invention may be of the type that does not imply use of capsules for preparation of liquid products.

Figure 4:
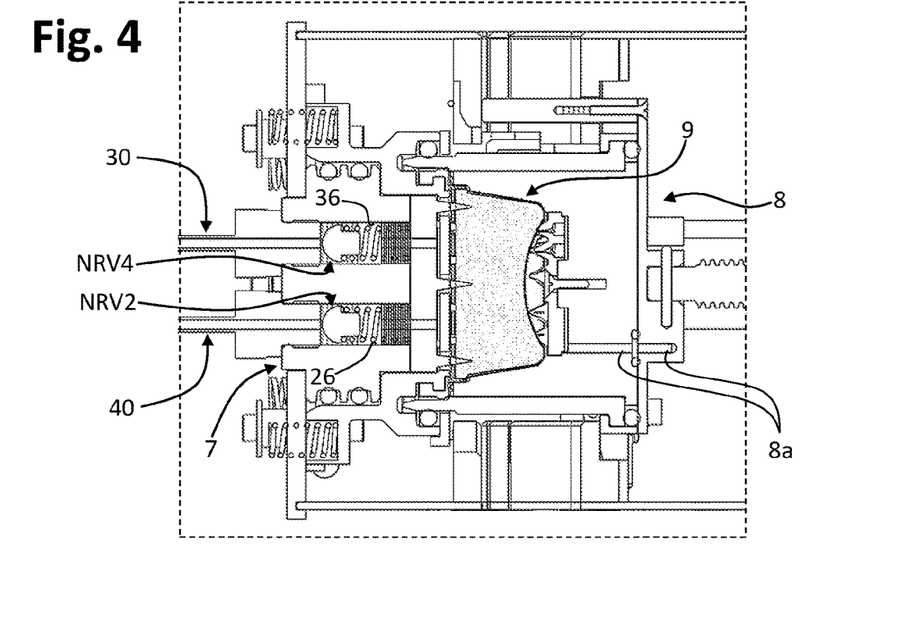
FIG. 4 is a schematic longitudinal section of a portion of a dispensing assembly according to one embodiment of the invention.

In the example illustrated in FIG. 1, the capsule-holder 8 is substantially coaxial with the axis designated by A and is mounted movable with respect to the casing 3. Once again with reference to the example illustrated, also the injector 7 is substantially coaxial with the axis A and preferably, but not necessarily, is mounted in a stationary position with respect to the casing 3. According to embodiments (not represented) the injector 7 may be movable, or else both the injector and the capsule-holder may be movable, in order to obtain passage between the spaced-apart position and the close position. As will emerge clearly hereinafter, preferably associated to the injector 7 is a one-way or non-return valve, designed to open only when the pressure inside a corresponding circuit for supply of the water and/or steam has reached a given value. One such valve may be housed inside a body of the injector 7, or else may be set externally thereto. In possible variant embodiments (not illustrated), the function of injection of the fluid into the capsule 9 may be performed in the second part 8 of the preparation chamber, and the function of dispensing of the liquid product may be performed in the first part 7, or else again one and the same part of the preparation chamber may be pre-arranged for injection of water and/or steam and dispensing of the liquid product.

The assembly 2 includes an arrangement for loading and unloading the capsules 9, which comprises an inlet passage and an outlet passage, which are designated by 10 and 11 in FIG. 1, here defined in positions substantially aligned to one another in the upper wall 5 and in the lower wall 6 of the casing 3, respectively. The loading and unloading arrangement preferably includes also retaining means, which are able to assume at least a condition of retention of a capsule 9 and at least a condition of release of the capsule 9. In this case, for example, switching of the retaining means between the conditions referred to above may preferably be obtained by a relative movement between the capsule-holder 8 and the injector 7, or else via an ejector member associated to the capsule-holder, all according to a technique in itself known (see, for example, the documents in the name of Luigi Lavazza S.p.A. already cited above). Preferably, the retaining means are provided within the casing 3 in an intermediate position between the inlet passage 10 and the outlet passage 11 so as to be operative between the injector 7 and the capsule-holder 8 when these are in the respective spaced-apart position.

Figure 2:
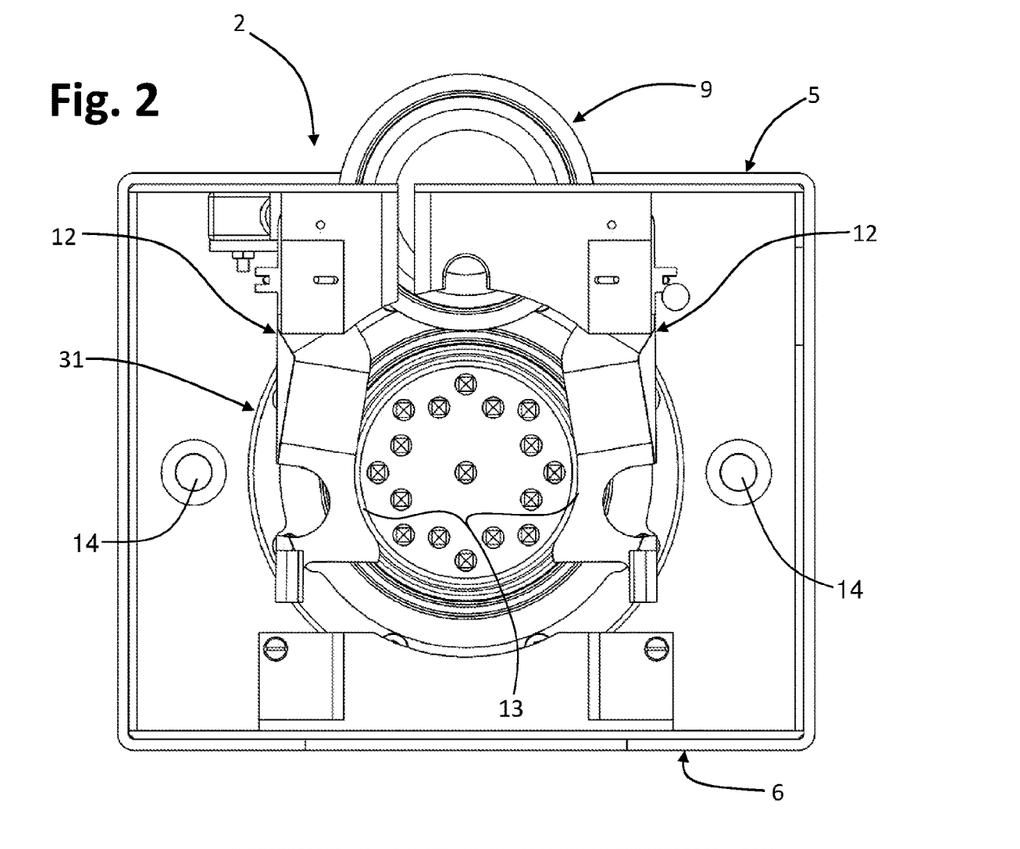
FIG. 2 is a schematic cross-sectional view of a dispensing assembly according to one embodiment of the invention.

With reference also to FIG. 2, in one embodiment, the retaining means comprise a stationary gripper device, which includes two jaw elements 12, referred to hereinafter for simplicity as "jaws". Preferably, the jaws 12 are mounted substantially symmetrically on opposite sides of the axis A, substantially in one and the same transverse plane. In the case exemplified, the jaws 12 extend in length substantially perpendicular to the axis A and are articulated via at least one pin (not visible), here parallel to the axis A and fixed with respect to the casing 3 or to the body of the injector 7. The jaws 12 may be provided with springs or similar elastic means (not visible), for example mounted in a position corresponding to the respective hinging pins, which are arranged so as to push the jaws themselves towards a position of equilibrium, visible in FIG. 2, in particular a position for retaining a capsule 9. In other embodiments, this position is obtained without the aid of dedicated springs, and the intrinsic elasticity of the material constituting the jaws—for example, a plastic material—is exploited for enabling divarication thereof. In the non-limiting example shown, the jaws 12 are articulated in an upper region thereof, but obviously they may be articulated in other regions, for example in the lower region.

In a preferred embodiment, the jaws 12 are shaped so as to define between them at least one seat, designated by 13 in FIG. 2, in particular a substantially cylindrical seat, preferably substantially coaxial with the axis A. The non-limiting arrangement exemplified is such that, during the step of loading from above, one part of the capsule 9, located behind an annular flange thereof (see, for example, FIG. 1), will penetrate between the jaws 12, causing divarication thereof by countering the action of the corresponding springs (or the intrinsic elasticity of the material constituting the jaws), until it reaches the seat 13. In this condition, the capsule 9 is withheld elastically by the jaws 12, in a position substantially coaxial with the axis A and intermediate with respect to the injector 7 and to the capsule-holder 8. In other embodiments (not represented), the seat 13 and the jaws 12 may be pre-arranged in such a way that reaching and holding of the aforesaid position by the capsule 9 is obtained in the absence of an elastic force exerted on the jaws themselves. In such a case, the presence of possible elastic means and/or the intrinsic elasticity of the material constituting the jaws 12 are/is exploited to enable divarication thereof and subsequent return to the position of equilibrium.

The body of each jaw 12 is preferably shaped—in particular in its part facing the capsule-holder 8—so as to interact with parts of the capsule-holder 8 in order to obtain a divarication of the jaws themselves. For this purpose, for example, the body of the jaws 12 may be provided with corresponding lead-in portions or inclined surfaces, or present projections designed to co-operate with corresponding parts, such as lead-in portions or inclined surfaces, present on the capsule-holder 8.

The retaining means of the assembly 2 may even have a conformation different from the one exemplified in FIG. 2, provided that they perform the general function of temporarily withholding a capsule 9 in an intermediate position that is substantially coaxial to the capsule-holder 8 and to the injector 7. For example, in an embodiment not represented, the retaining means comprise guide elements that can be engaged by the flange of a capsule 9, which are designed to support the latter in the aforesaid intermediate position. After the capsule has been taken up by the capsule-holder 8, during approach of the latter to the injector 7, the possibility of deformation of the aforesaid flange is exploited in order to release it from the corresponding guide elements. The retaining means could also be carried directly by the capsule-holder 8 or by the injector 7, for example in the form of projecting jaws or arms, which are designed to divaricate following upon interaction with the body of the injector 7 or of the capsule-holder 8, respectively. Moreover, in the withholding position the capsule 9 does not necessarily have to share the axis A. In this intermediate position, in fact, the axis of the capsule 9 could also be parallel, or slightly inclined with respect, to the axis A. In such a variant embodiment, it is possible to exploit the conicity of the peripheral wall of the capsule 9 and of the housing defined in the capsule-holder 8 to obtain a relative movement of centring between the elements in question, during advance of the capsule-holder, as clarified hereinafter. It should on the other hand be emphasized that the presence of the retaining means does not constitute an essential element of the invention, it being possible for these means to be absent (for example, in the case of assemblies with roto-translational movement, such as those described in the documents Nos. WO 2013/182923 A1 and WO 2013/038318 A1 already cited above).

Preferably, the profile of the inlet passage 10 substantially corresponds to the cross section of the capsule 9 so as to enable a guided introduction thereof with relative precision into the assembly 2. In this perspective, for example, the opening 10 preferably defines opposite guide grooves for the projecting flange of the capsule 9, one of these grooves being visible for example in FIG. 1, where it is designated by 10*a*. During loading, after the capsule 9 has passed beyond the opening 10, it is then taken up by the retaining means, with modalities in themselves known.

The assembly 2 includes two opposite linear guides, represented schematically in FIG. 2, where they are designated by 14, constituted for example by cylindrical rods. Engaged in the two guides 14, parallel to one another and to the axis A, are respective lateral guide elements of the capsule-holder 8 (not visible).

The cup-shaped body of the capsule-holder 8 has a lateral or peripheral wall, which defines an inner surface of the housing for the capsule 9, which is substantially shaped like a truncated cone or has some other shape complementary to the one of the side wall of the capsules used. The body of the capsule-holder 8 then has a bottom wall, extending through which is a respective portion of the aforesaid duct 8*a* for dispensing of the liquid product. The duct 8*a* extends as far as a corresponding dispensing area of the machine 1 (not visible in the figures), which terminates with a nozzle.

The injector 7 and/or the capsule-holder 8 may be provided with respective devices for perforation of the capsule 9, comprising one or more tips or reliefs, as visible for example in FIG. 1, all according to known technique. As has been said, the invention may in any case be applied also to the case of dispensing assemblies for capsules having one or more pre-perforated end walls, or for capsules made of filter paper, in which case it is not necessary to provide a perforating device in the injector 7 and/or in the capsule-holder 8.

In the embodiment exemplified, the capsule-holder 8 can be displaced in two opposite directions along an axis of actuation, here represented by the axis A, via an actuation system. In a preferred embodiment, the actuation system is motor-driven and comprises an electric actuator, in particular a bidirectional electric motor, designated by 15 in FIG. 1. In a preferred embodiment, associated to the motor 15 is a motor reducer, an output gear of which is engaged with a gear wheel 16. The gear wheel 16 is fixed in rotation with respect to a volute 17, engaged in which is a threaded rod 18, which is fixed with respect to the bottom of the capsule-holder 8 and coaxial with the axis A.

Starting from the retracted position of the capsule-holder 8, visible in FIG. 1, actuation of the motor 15 in a first direction brings about, via the aforesaid motor reducer, rotation of the gear wheel 16, and hence of the volute 17. The capsule-holder 8 is constrained laterally to the guide rods 14 and the threaded rod 18 is fixed thereto. Rotation of the volute 17 hence determines progressive advance of the capsule-holder 8 towards the injector 7, as far as a position where they are close to one another, visible in FIG. 4, which can be detected, for example, via a suitable sensor, such as a micro-switch. By causing then rotation of the motor 15, and hence of the rod 18, in the opposite direction, it is possible to obtain an opposite displacement of the capsule-holder 8, i.e., a recession thereof away from the injector 7, into the respective position of FIG. 1 where they are at a distance from one another, which can also be detected, for example, via a microswitch or some other suitable sensor. Of course, alternative embodiments of the actuation system of the assembly 2 are possible. According to variants (not represented), the system for actuation of the preparation chamber 7, 8 is manual, according to a technique in itself known.

The dispensing assembly according to the invention comprises a hydraulic circuit, configured for supplying water and/or steam to the preparation chamber 7-8.

Figure 3:
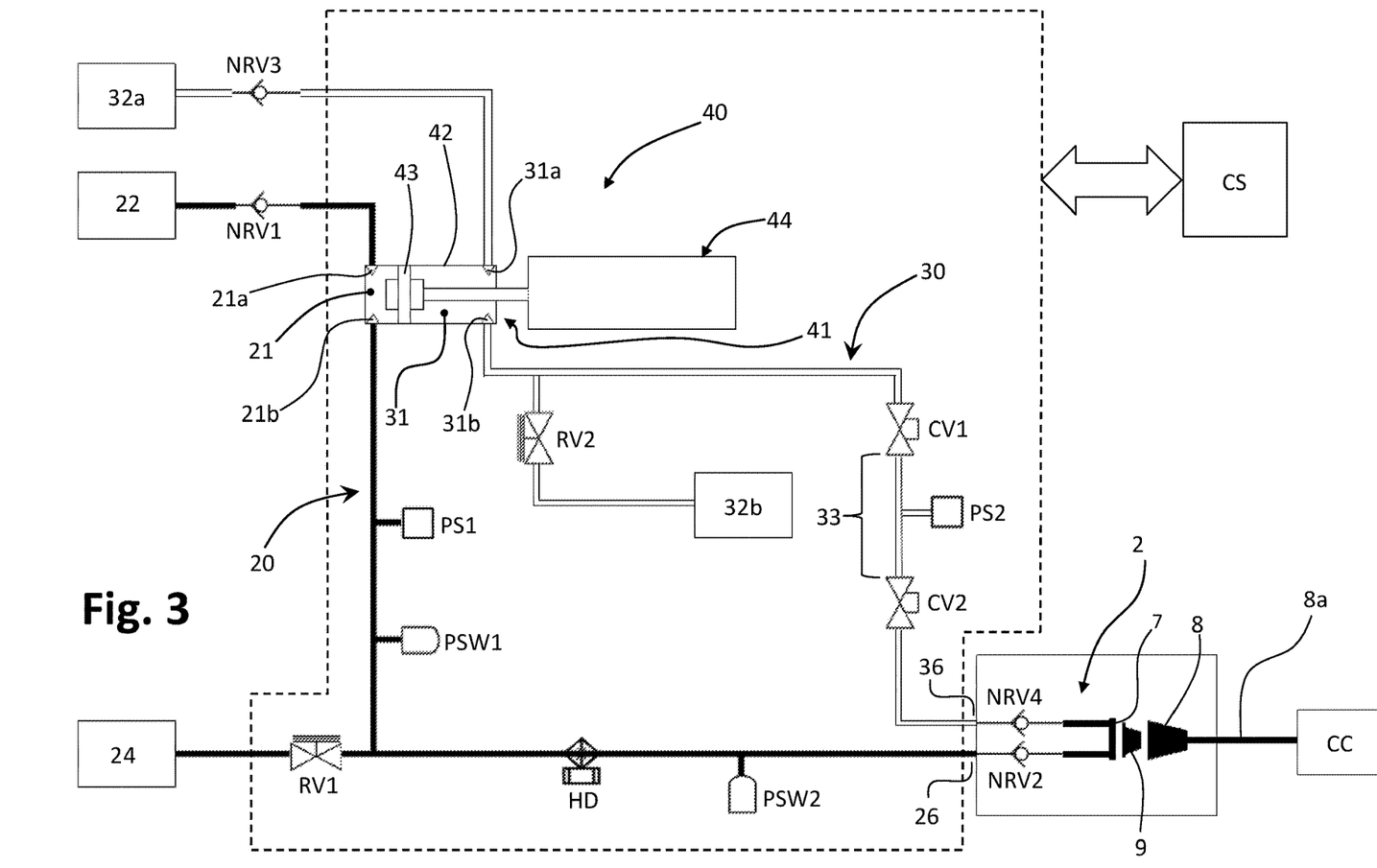
FIG. 3 is a schematic representation of fluidic circuits of a dispensing machine according to one embodiment of the invention.

An example of hydraulic circuit that can be used in combination with the assembly 2 is represented schematically in FIG. 3, where this circuit is designated as a whole by 20. The circuit 20 comprises a series of fluid-tight ducts in fluid communication with one another, not designated by reference numbers but represented with a single line in the figure.

The circuit 20 includes pumping means 21, having an intake inlet 21a, in fluid communication with a water source 22, for example a reservoir of the machine 1. Preferably, provided on the stretch of circuit between the inlet 21a and the source 22 is at least one non-return valve, designated by NRV1, preferably calibrated so as to open only when the water intake pressure exceeds a given value.

The pumping means 21 then have a delivery outlet 21b, which is in fluid communication with the injector 7 of the dispensing assembly 2. Operative along the stretch of circuit between the outlet 21b and the injector 7 is a heater device HD, of a conception in itself known, comprising, for example, an electrical resistance. The heater HD is configured for heating the water pumped by the means 21 to the injector 7 up to a given temperature, which may be a temperature of evaporation of the water, which can be controlled via a temperature sensor (not represented).

In one embodiment, operative on the stretch of the circuit 20 comprised between the outlet 21b of the pumping means 21 and the heater HD is a pressure sensor PS1 of a type in itself known. In addition or as an alternative, on the same stretch of the circuit 20 there may be provided a pressure switch PSw1, which is also of a conception in itself known.

In one embodiment, operative on the circuit 20, downstream of the pumping means 21 is a relief valve RV1, which is also of a known conception. Very preferably, this valve RV1 is operative on the stretch of circuit comprised between the outlet 21b and the heater HD. When envisaged, the relief valve RV1 has an outlet end preferably in fluid communication with a liquid-accumulation volume, represented schematically and designated by 24, for example a duct having a capacity of some centilitres or a collection tray with which the machine 1 is equipped. Between the heater HD and the injector 7 there may be operative a second pressure switch PSw2 or other devices which are designed for control of the fluid-dynamic parameters of the liquid passing in the circuit.

As already mentioned, upstream of the injector 7 the circuit 20 comprises a non-return valve, designated by NRV2, preferably designed to open only when the pressure of delivery of the water and/or steam downstream of the heater HD has reached a given value.

According to a characteristic of the invention, the dispensing assembly 2 comprises a pneumatic circuit, configured for supplying compressed (pressurized) air to the preparation chamber 7, 8. Provision of one such circuit makes it advantageously possible to carry out a step of purging or cleaning of the preparation chamber 7, 8 and of the corresponding dispensing duct 8a, as will emerge hereinafter.

A possible example of pneumatic circuit that can be used in the assembly 2 is likewise shown schematically in FIG. 3, where it is designated as a whole by 30. Also the circuit 30 comprises a series of fluid-tight ducts in fluid communication with one another, represented with a double line in the figure but without any reference numbers.

Also the circuit 30 includes pumping means 31, having an intake inlet 31a that provides, or that is in fluid communication with, an intake of air at ambient pressure, represented schematically by the block 32a, for example inside the casing of the assembly 2 or of the machine 1. Preferably, also in this case, provided on the stretch of circuit between the inlet 31a and the air intake 32a is at least one non-return valve, designated by NRV3, preferably calibrated for opening only when the air-intake pressure exceeds a given value.

The pumping means 31 then have a delivery outlet 31b, which is in fluid communication with the injector 7 of the assembly 2. In a preferred embodiment, defined along the stretch of circuit between the outlet 31b and the injector 7 is a plenum space, designated by 33. Preferably, the circuit 30 envisages for this purpose two controllable electric valves CV1 and CV2, one upstream of the other along a duct of the circuit 30. In a position corresponding to the plenum space 33 there may be operative a pressure sensor PS2, of a conception in itself known.

In one embodiment, present on the circuit 30, downstream of the pumping means 31, is a relief valve RV2, of a known conception. Very preferably, this valve RV2 is operative on the stretch of circuit comprised between the outlet 31b and the plenum space 33. The outlet end of the relief valve RV2 is at ambient pressure, opening for example inside the casing of the assembly 2 or of the machine, as represented schematically by the block 32b. Finally, upstream of the injector 7, the circuit 30 comprises a non-return valve NRV4, preferably designed to open only when the pressure of delivery of the air downstream of the plenum space 33 is higher than a given value. The combination of opening and closing of the valves CV1 and CV2 determines withholding of air and its expulsion towards the preparation chamber 7 of the assembly 2.

In FIG. 3 the block CS represents schematically a control system of the assembly 2, i.e., of the machine 1, pre-arranged for control of the various electrical components, amongst which the ones described previously. The control system CS preferably includes a user interface, such as a control panel, of a type in itself known.

In a preferred embodiment, the control system CS is pre-arranged for controlling automatically the hydraulic circuit 20 and the pneumatic circuit 30 in order to supply compressed air to the preparation chamber 7, 8 after the latter has been supplied with water and/or steam, in particular after dispensing of the liquid food product. In this way, immediately after dispensing of the liquid food product, the preparation chamber 7, 8 and the dispensing duct 8a can be purged.

In a particularly advantageous embodiment, the control system CS is pre-arranged for:
  activating the pumping means 21 of the pneumatic circuit 30;
  causing opening of the valve CV1 while keeping the valve CV2 in a closed condition and while the pumping means 31 of the pneumatic circuit 30 are active;
  subsequently causing closing of the valve CV1, for storing compressed air in the plenum space 33; and
  subsequently causing opening of the valve CV2 in order to cause outflow of the compressed air from the plenum space 33 to the preparation chamber 7, 8.

In this way, the compressed air can be stored in the plenum space 33 also during operation of the hydraulic circuit 20. This solution is then advantageous when, in a preferred embodiment, the functions of the pumping means 21 and 31 are integrated in a double-acting pumping device.

As has been seen, in a preferred embodiment, the first part of the preparation chamber, here represented by the injector 7, has a first inlet in fluid communication with the hydraulic circuit 20 and a second inlet in fluid communication with the pneumatic circuit 30. An example in this sense may be seen in FIG. 1, where the aforesaid inlets are designated, respectively, by 26 and 36. This solution enables simplification of construction of the assembly 2, in particular in relation to the connection of the outlets of the circuits 20 and 30, and improvement of the fluid-dynamic characteristics of the circuits themselves.

In an embodiment of this type, advantageously, the non-return valves NRV2 and NRV4 are directly associated to the inlets 26 and 36 of the first part 7 of the preparation chamber, for example as represented schematically in FIG. 4, to the advantage of a reduction in the overall dimensions. As has been said, the non-return valves NRV2 and NRV4 (as likewise the valves NRV1 and NRV3) may be of a known conception, for example (see FIG. 4) comprising an open/close element, which is forced by a corresponding spring into a position of closing of the corresponding circuit 20 or 30, this spring being calibrated for enabling passage of the open/close element into an opening position only when a certain pressure of the water or of the air, respectively, is exceeded.

In embodiments not represented, the pumping means of the hydraulic circuit and the pumping means of the pneumatic circuit may be distinct from one another; i.e., they may include two different pumping devices independent of one another and controlled by the control system CS. In an embodiment of this type the plenum space and the corresponding valves CV1 and CV2 may be omitted.

In a particularly advantageous embodiment, on the other hand, the pumping means 21 and the pumping means 31 are provided by one and the same pumping device, with evident benefits in terms of simplicity, economy, and reduction of the dimensions of the preparation machine. An embodiment of this type is exemplified in FIG. 3, where the aforesaid pumping device is designated as a whole by 40.

In a preferred embodiment, the pumping device 40 comprises a double-acting hydraulic pump 41, having a cylinder 42 and a piston 43, which is displaceably mounted in the cylinder 42 so as to define therein two variable-volume chambers. In FIG. 3, these chambers are represented by the volumes designated by 21 and 31, previously identified as the pumping means of the hydraulic circuit 20 and pneumatic circuit 30, respectively. Associated to the piston 43 is a corresponding linear-actuation system 44, of any known conception. Each variable-volume chamber 21, 31 hence has an inlet 21a, 31a in fluid communication with the points of intake 22, 32a of water and air at ambient pressure, respectively, and an outlet 21b, 31b, in fluid communication with a respective inlet of the preparation chamber 7, 8, such as the inlets designated by 26 and 36 in FIG. 1 and in FIG. 4. Actuation of the piston 43 in one direction brings about intake of water into the circuit 20 and delivery of air into the circuit 30, whereas actuation of the piston 43 in the opposite direction brings about delivery of water into the circuit 20 and intake of air into the circuit 30.

A non-limiting example of operation of the assembly 2 is described hereinafter, with reference to the embodiment exemplified in FIG. 3.

With the machine 1 turned on and prior to start of a cycle of preparation of a liquid product, the electric valves CV1 and CV2 are in a closed condition, the heater HD is inactive, and the pumping device 40 is in an inactive position, with the chamber 21 at a minimum given volume and the chamber 31 at a maximum given volume.

The user introduces a capsule 9 into the assembly 2, through the corresponding inlet passage 10. The capsule 9 reaches by gravity the retaining position defined between the jaws 12, or else is pushed in this position with modalities in themselves known.

The control system CS then governs starting of the motor 15. Starting may be enabled by the user, by pressing a purposely provided push-button or key on the user interface of the machine 1 and/or may be enabled through detection made by a suitable sensor, such as a microswitch, which senses the presence of the capsule 9 in the position defined between the jaws 12.

Rotation of the motor 15 in a first pre-determined direction causes advance of the capsule-holder 8 towards the injector 7. Following upon reaching of the close position of the injector 7 and the capsule-holder 8 (which can also be detected for example via a suitable sensor, such as a microswitch), the control system CS activates the heater HD. Next, the control system CS governs opening of the valve CV1, and the actuation system 44 of the pump 41 is actuated to displace the piston 43 in a first direction in order to cause an increase of the volume of the chamber 21 and a corresponding decrease of the volume of the chamber 31. In this way, in the chamber 21 water is taken in from the source 22, through the non-return valve NRV1. Displacement of the piston 43 in the first direction also determines compression of the air in the stretch of the circuit 30 that extends between the outlet 31b and the valve CV2, which is still closed (given also the presence of the non-return valve NRV3).

If the sensor PS2 is provided and if, in the course of the movement of the piston 43, the sensor detects a pressure of the water in the circuit 20 lower than a minimum threshold, the preparation cycle is at least temporarily interrupted, since the low pressure can be deemed indicative of lack of water at inlet (for example, due to absence of water in the reservoir of the machine). In this case, an alarm warning may be issued, for example by turning on a warning light on the user interface or by activating a buzzer.

When the pump 41 has taken in the given amount of water (for example 30 ml), corresponding to a given stroke of the piston 43, the control system CS interrupts operation of the actuation system 44 of the pumping device 40 and governs closing of the valve CV1 so as to store compressed air in the plenum space 33. In this step, if the sensor PS1 is provided, the sensor is used by the control system CS for monitoring the pressure of the air in the plenum space 33 in order to identify any possible leakage or malfunctioning of the valves. Also in this case a visual or acoustic warning may be issued.

After the heater HD has heated the water to the given temperature (for example, 95° C.), detected via a suitable temperature sensor, the control system CS issues a command for a new actuation of the pumping device 40, i.e., a displacement of the piston 43 in a second direction, opposite to the previous one, in order to push the water towards the preparation chamber 7, 8, through the heater HD and the non-return valve NRV2. During preparation, the hot water is then injected into the capsule 9 via the non-return valve NRV2 and the injector 7. This valve hence prevents leakage of water from the hydraulic circuit 20 when the preparation chamber 7, 8 is open and the pump 41 is inactive and moreover prevents, after the liquid product has been dispensed, any return of residue of the product into the hydraulic circuit 20. The hot water flows through the capsule 9 in order to obtain the liquid product, thereby also determining a drop in pressure in the circuit 20. The liquid product leaving the preparation chamber 7, 8 traverses the corresponding dispensing duct 8a until it reaches the collection container, for example a coffee cup, represented schematically by the block CC of FIG. 3.

Movement of the piston 43 in the second direction determines reduction of the pressure of the air in the circuit 30, between the non-return valve NRV3 and the electric valve CV1, until it is equal to ambient pressure. The further linear movement of the piston 43 causes subsequent intake of air into the pneumatic circuit 30, through the non-return valve NRV3 and the associated ambient-air intake 32*a*.

Upon completion of dispensing of the liquid product, the compressed air previously stored in the plenum space 33 is released. Any possible residue of liquid still present in the chamber 7, 8 and in the corresponding dispensing duct 8*a* is then removed thanks to the flow of air. In particular, when the piston 43 is at end-of-travel, i.e., when the chamber 31 has reached its maximum volume and is full of air, it is no longer possible to proceed with delivery of water into the circuit 20. The heater HD is hence de-activated, and the valve CV2 is opened. Opening of the valve CV2 enables the compressed air to flow from the plenum space 33 to the preparation chamber 7, 8, through the non-return valve NRV4. The flow of air passes through the chamber 7, 8 (and hence through the exhausted capsule 9) and is then released onto the outside of the assembly 2, towards the container CC for collection of the liquid product, thereby enabling purging of the preparation chamber 7, 8 and of the corresponding dispensing duct 8*a*.

After the step of purging with air, the dispensing duct 8*a* substantially no longer contains liquid residue, but only air practically at ambient pressure. The valve CV2 can hence be reclosed, thus bringing back the assembly 2 into its initial condition.

The control system can then issue a command for a new activation of the motor 15, in a direction opposite to the previous one, so as to bring back the injector 7 and the capsule-holder 8 into the spaced-apart position. In the course of its recession, the capsule-holder 8 draws along with it the exhausted capsule 9, the flange of which interferes at a certain point with the front of the jaws 12. In this step, the jaws are still kept divaricated via purposely provided parts of the capsule-holder 8, and the spent capsule can drop by gravity towards the discharge passage 11. As has been said, on the other hand, the retaining means and consequently the modalities of discharge of the exhausted capsules in the assembly according to the invention can be provided according to any technique known in the sector. As the end-of-travel position in recession is reached, the control system CS stops the motor 15. As already mentioned, the actuation system of the assembly 2 may also be of a manual-actuation type.

The temperature sensor associated to the heater HD ensures that the latter does not overheat and guarantees that the given temperature will be maintained. There may possibly be provided at least one thermal switch, not represented, which is activated for interrupting supply to the heater HD in the case where the temperature of the water exceeds a maximum limit (for example, 100° C.).

The sensor PS1 may be used for monitoring the pressure of the air also while the piston 43 is pushing the air into the circuit 30, with the electric valve CV2 closed. A value of pressure out of a given range causes interruption, by the control system CS, of the preparation process, with possible warning (this anomalous pressure value may, for example, be indicative of a leakage in the circuit 30).

The pressure switch PSw1 can be provided for the purpose of guaranteeing safety of the system in the case of malfunctioning of the pressure sensor PS2 or of the control system CS such as not to enable maintenance of the pressure of the water within a given range. The switch PSw1 may, for example, be configured for causing interruption of electrical supply to the actuation system 44 of the pumping device 40 and to the heater HD.

The pressure switch PSw2 may be provided for monitoring that the pressure of the water in the circuit 20 returns—after dispensing—to a value close to the pre-set one. For example, in the case where the pressure of the water remains high, i.e., beyond a certain threshold, the control system CS may inhibit opening of the preparation chamber 7, 8, not enabling starting of the motor 15 aimed at bringing the two parts 7 and 8 into the position where they are set at a distance from one another (in the case of a manual actuation system, the system CS can activate a mechanical-blocking device, of any known conception). This is useful for ensuring that the preparation chamber 7, 8 will remain closed as long as the pressure of the water in the circuit 20 is deemed excessive, thereby preventing any undesired exit of hot water and/or steam from the assembly 2 following upon opening of the preparation chamber 7, 8.

The two relief valves RV1 and RV2 may be provided when it is intended to prevent in any case exceeding of a maximum design pressure of the circuits 20 and 30, for example 8 bar, in case of any anomaly of operation of the assembly 2.

Figure 5:
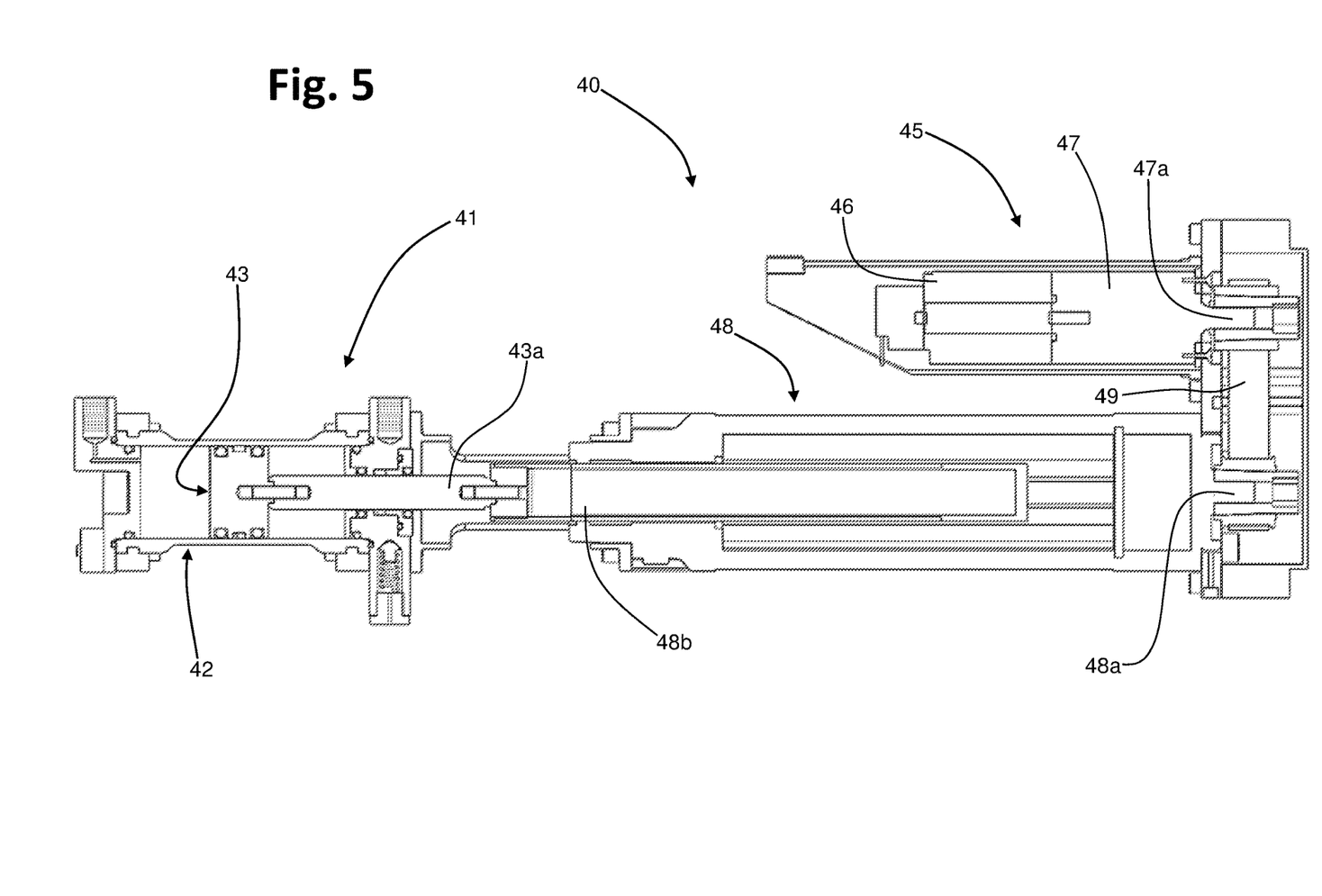
FIG. 5 is a schematic longitudinal section of a pumping device that can be associated to a dispensing assembly according to one embodiment of the invention.

FIG. 5 is a schematic illustration of a possible embodiment of a double-acting pumping device, of the same type as the one already designated by 40.

In the embodiment exemplified, the device 40 includes three functional units, represented by a motor assembly 45 and a linear actuator 48 (which here provide the actuation system previously designated by 44), as well as the hydraulic pump 41.

The motor assembly 45 may comprise, for example, a d.c. motor 46 of a brushless type, for example supplied at 24 V, with a motor reducer 47 of a known conception associated thereto, having an output shaft 47*a*. The torque is transferred from the shaft 47*a* of the motor reducer 47 to an input shaft 48*a* of the linear actuator 48, for example via a transmission member 49, such as a belt. Also the actuator 48 may be of any known conception, of a type designed to convert the rotary movement and the torque generated by the shaft 47*a* into a movement and thrust of an output shaft 48*b* with linear movement, for example with a stroke of 5 cm. The hydraulic pump 41 is the component that provides compression of the water for preparation of the liquid product and of the air for the subsequent purging step. The pump 41 includes the cylinder 42 and the piston 43, which define between them the variable-volume chambers 21 and 31. The stem 43*a* of the piston 43 is connected to the shaft 48*b* with linear displacement of the actuator 48. The maximum stroke of the piston 43 is preferably similar to that of the shaft 48*b*.

Figure 6:
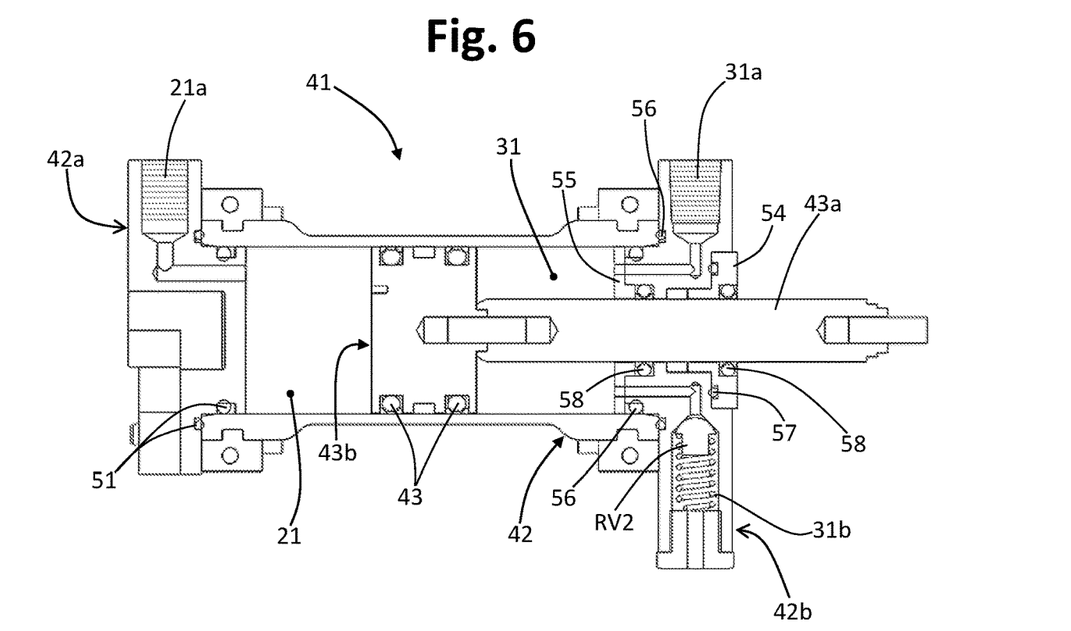
FIG. 6 is a schematic longitudinal section of a component of the device of FIG. 5.
Figures 7, 8:
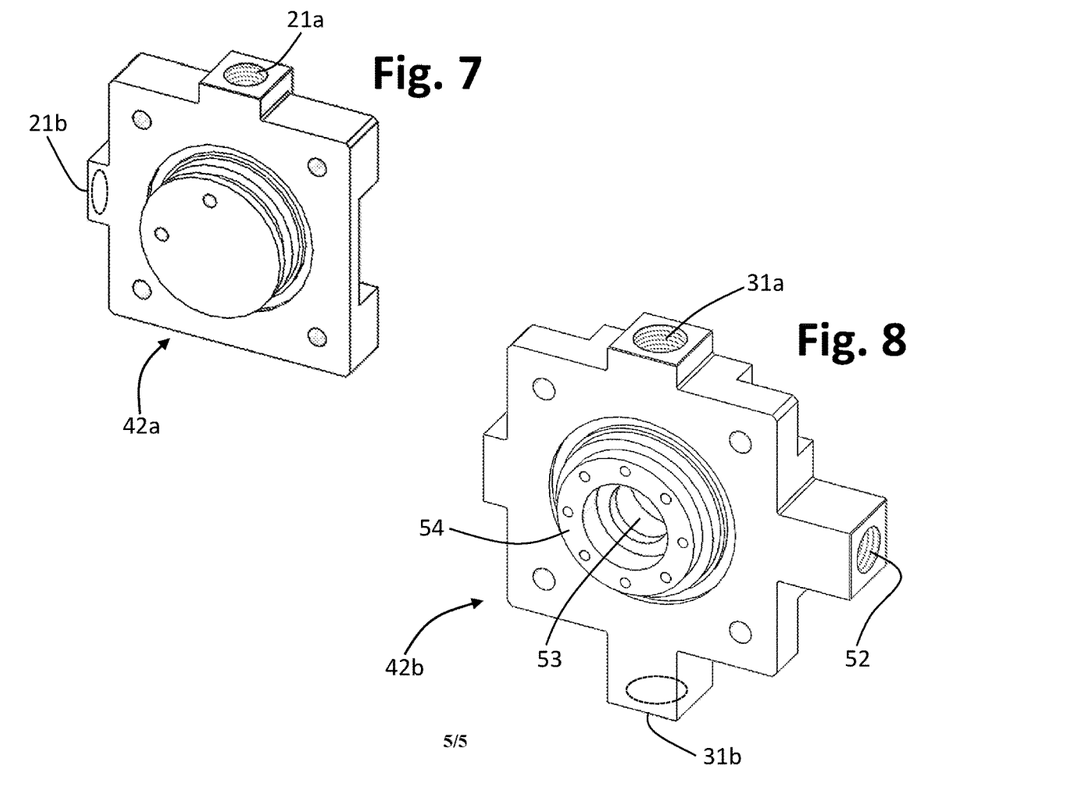
FIGS. 7 and 8 are schematic perspective views of parts of the component of FIG. 6.

As may be seen in FIG. 6, the cylinder 42 includes two cylinder heads 42*a* and 42*b*, visible also in FIGS. 7 and 8, one of which delimits the chamber 21 and the other delimits the chamber 31. Associated to the piston 43 are suitable elements 43*b* that provide fluid-tightness in regard to the inner surface of sliding of the cylinder 42.

Defined in the head 42*a* are the inlet 21*a* and the outlet 21*b*, to the first of which there may be directly associated the non-return valve NRV1. As may be seen in FIG. 6, provided between the head 42*a* and the first end of the main body of the cylinder 42 are one or more annular seal gaskets, designated by 51. Likewise, defined in the head 42*b* are the inlet 31*a* and the outlet 31*b*. The non-return valve NRV3 may be directly associated to the inlet 31*a*. In a preferred embodiment, the head 42*b* moreover includes an attachment 31*b* (FIG. 8), to which there can be associated the relief valve RV2. The head 42*b* then has a through opening 53 (FIG. 8) for the stem 43*a* of the piston 43, associated to the opposite end of which are respective flanges 54 and 55.

Suitable annular seal gaskets, some of which are designated by 56, are provided between the head 42b and the second end of the main body of the cylinder 42. An annular gasket 57 may be operative also between the head 42b and the flange 54. Further annular gaskets 58 are then provided, designed to operate in a fluid-tight way on the stem 43a of the piston 43, said gaskets being preferably housed in corresponding seats defined between each flange 54 and 55 and the head 42b, as may be clearly seen in FIG. 6.

As already explained, a displacement of the piston 43 in one direction (from left to right, as viewed in FIG. 6) brings about an increase of the volume of the chamber 21, with a consequent intake of water from the inlet 21a, and a decrease of the volume of the chamber 31, with a consequent thrust on the air contained in the stretch of the circuit 30 comprised between the chamber 31 and the valve CV2 (with the valve CV1 open and the valve CV2 closed). A displacement of the piston 43 in a direction opposite to the previous one (i.e., from right to left, as viewed in FIG. 6) brings about, instead, an opposite variation of the volume of the chambers 21 and 31, with intake of air from the inlet 31a and a thrust on the water present in the circuit 20. The reciprocating movements of the piston 43 are determined by the linear actuator 48 and by the motor assembly 45, managed by the control system SC with the aid of corresponding sensors means, the motor 46 being evidently of a bidirectional type.

From the description provided the characteristics of the present invention emerge clearly, as likewise its advantages.

It is clear that numerous variations may be made by the person skilled in the art to the assembly and to the machine described by way of example herein, without thereby departing from the scope of the invention as defined in ensuing claims.

The invention claimed is:

1. A dispensing assembly for a machine for the preparation of liquid food products, the dispensing assembly comprising
    a preparation chamber,
    a pneumatic circuit for supplying compressed air to the preparation chamber, and
    a hydraulic circuit configured for supplying water to the preparation chamber, the hydraulic circuit comprising a water pump and a water duct having a duct inlet and a duct outlet, the duct inlet of the water duct being in fluid communication with a water source,
    wherein the preparation chamber is configured for receiving at least one dose of a precursor of a liquid food product and for dispensing the liquid food product upon passage of water through the preparation chamber,
    wherein the preparation chamber comprises a first chamber part and a second chamber part operable to define a receiving volume therebetween, at least one chamber part being displaceable relative to the other chamber part between a spaced-apart position, to enable loading of said dose into the receiving volume, and a closed position, to enable introduction of water into the receiving volume and dispensing of a liquid food product therefrom,
    wherein the first chamber part has a first inlet to which the duct outlet of the water duct of the hydraulic circuit is connected, such that water is supplied to the receiving volume via the first inlet,
    wherein the pneumatic circuit is configured for supplying compressed air to the preparation chamber for purging the receiving volume, the pneumatic circuit comprising an air duct having a duct inlet and a duct outlet, the duct inlet of the air duct being in fluid communication with a source of compressed air,
    wherein the first chamber part has a second inlet to which the duct outlet of the air duct of the pneumatic circuit is connected, such that compressed air is supplied to the receiving volume via the second inlet,
    wherein the source of compressed air comprises an air pump having an air pump outlet in fluid communication with the duct inlet of the air duct,
    wherein the water pump and the air pump are integrated in one and the same double-acting pump, and
    wherein the pneumatic circuit further comprises a first controllable valve and a second controllable valve both set on the air duct, the second controllable valve being set on the air duct downstream of the first controllable valve, such that the two controllable valves delimit in the air duct a plenum space for air.

2. The dispensing assembly according to claim 1, wherein the hydraulic circuit and the pneumatic circuit are operable such that compressed air is supplied to the preparation chamber via the air duct and the second inlet after water has been supplied to the preparation chamber via the water duct and the first inlet.

3. The dispensing assembly according to claim 1,
    wherein the water pump has a water pump outlet in fluid communication with the duct inlet of the water duct, and a first non-return valve set on the water duct upstream of the first chamber part and downstream of the water pump, and
    wherein the pneumatic circuit comprises a second non-return valve set on the air duct upstream of the first chamber part and downstream of the air pump.

4. The dispensing assembly according to claim 3,
    wherein the first non-return valve is directly associated to the first inlet of the first chamber part, and the second non-return valve is directly associated to the second inlet of the first chamber part.

5. A dispensing assembly for a machine for the preparation of liquid food products, comprising a preparation chamber and a hydraulic circuit configured for supplying water to the preparation chamber, the hydraulic circuit comprising a water duct having a duct inlet and a duct outlet, the duct inlet of the water duct being in fluid communication with a water source,
    wherein the preparation chamber is configured for receiving at least one dose of a precursor of a liquid food product and for dispensing the liquid food product following upon passage of water through the preparation chamber,
    wherein the preparation chamber comprises a first chamber part and a second chamber part operable to define a receiving volume therebetween, at least one chamber part being displaceable relative to the other chamber part between a spaced-apart position, to enable loading of said dose into the receiving volume, and a closed position, to enable introduction of water into the receiving volume and dispensing of a liquid food product therefrom,
    wherein the first chamber part has a first inlet to which the duct outlet of the water duct of the hydraulic circuit is connected,
    wherein the dispensing assembly further comprises a pneumatic circuit configured for supplying compressed air to the preparation chamber for purging the receiving volume, the pneumatic circuit comprising an air duct having a duct inlet and a duct outlet, the duct inlet of the air duct being in fluid communication with a source of compressed air, wherein the first chamber part has a second inlet to which the duct outlet of the air duct of the pneumatic circuit is connected, such that water is supplied to the receiving volume via the first inlet and compressed air is supplied to the receiving volume via the second inlet, wherein the hydraulic circuit comprises a water pump having a water pump outlet in fluid communication with the duct inlet of the water duct, and a first non-return valve set on the water duct upstream of the first chamber part and downstream of the water pump, wherein the pneumatic circuit comprises an air pump having an air pump outlet in fluid communication with the duct inlet of the air duct, and a second non-return valve set on the air duct upstream of the first chamber part and downstream of the air pump, and wherein the water pump of the hydraulic circuit and the air pump of the pneumatic circuit are integrated in one and the same double-acting pump.

6. The dispensing assembly according to claim 5, wherein the double-acting pump comprises a cylinder and a piston, which is displaceably mounted in the cylinder so as to define therein a first variable-volume chamber for water and a second variable-volume chamber for air, wherein the first variable-volume chamber has a water inlet in fluid communication with a water-intake point, and a water outlet in fluid communication with the duct inlet of the water duct, and wherein the second variable-volume chamber has an air inlet in fluid communication with an air-intake point, and an air outlet in fluid communication with the duct inlet of the air duct.

7. A dispensing assembly for a machine for the preparation of liquid food products, comprising a preparation chamber and a hydraulic circuit configured for supplying water to the preparation chamber, the hydraulic circuit comprising a water duct having a duct inlet and a duct outlet, the duct inlet of the water duct being in fluid communication with a water source, wherein the preparation chamber is configured for receiving at least one dose of a precursor of a liquid food product and for dispensing the liquid food product following upon passage of water through the preparation chamber, wherein the preparation chamber comprises a first chamber part and a second chamber part operable to define a receiving volume therebetween, at least one chamber part being displaceable relative to the other chamber part between a spaced-apart position, to enable loading of said dose into the receiving volume, and a closed position, to enable introduction of water into the receiving volume and dispensing of a liquid food product therefrom, wherein the first chamber part has a first inlet to which the duct outlet of the water duct of the hydraulic circuit is connected, wherein the dispensing assembly further comprises a pneumatic circuit configured for supplying compressed air to the preparation chamber for purging the receiving volume, the pneumatic circuit comprising an air duct having a duct inlet and a duct outlet, the duct inlet of the air duct being in fluid communication with a source of compressed air, wherein the first chamber part has a second inlet to which the duct outlet of the air duct of the pneumatic circuit is connected, such that water is supplied to the receiving volume via the first inlet and compressed air is supplied to the receiving volume via the second inlet, and wherein the pneumatic circuit comprises a first controllable valve and a second controllable valve both set on the air duct, the second controllable valve being set on the air duct downstream of the first controllable valve, such that the two controllable valves delimit in the air duct a plenum space for air.

8. The dispensing assembly according to claim 7, wherein the hydraulic circuit and the pneumatic circuit are operable such that compressed air is supplied to the preparation chamber via the air duct and the second inlet after water has been supplied to the preparation chamber via the water duct and the first inlet, wherein the hydraulic circuit has a water pump and the pneumatic circuit has an air pump, and wherein the pneumatic circuit is moreover operable for:
 causing opening of the first controllable valve while keeping the second controllable valve closed, with the air pump active;
 subsequently causing closing of the first controllable valve for storing compressed air in the plenum space; and
 subsequently causing opening of the second controllable valve in order to cause outflow of the compressed air from the plenum space.

9. The dispensing assembly according to claim 1, wherein at least one of the hydraulic circuit and the pneumatic circuit comprises at least one from among:
 a relief valve;
 a pressure sensor;
 a pressure switch; and
 a non-return valve.

10. The dispensing assembly according to claim 2, wherein the hydraulic circuit and the pneumatic circuit are operable to supply compressed air to the preparation chamber via the air duct when the first chamber part and the second chamber part are in the closed position and after dispensing of the liquid food product.

11. A machine for the preparation of liquid products comprising a dispensing assembly according to claim 1.

12. A system for the preparation of liquid products, comprising:
 a machine for the preparation of liquid products that includes a dispensing assembly according to claim 1; and
 a capsule containing a dose of a precursor of a liquid food product, which is able to form the liquid food product via water.

13. The dispensing assembly according to claim 10, wherein the second chamber part is configured for dispensing the liquid food product from the preparation chamber.

14. The dispensing assembly according to claim 1, wherein the first inlet and the second inlet are fluidically independent from each other such that water is suppliable to the preparation chamber via the first inlet only, and compressed air is suppliable to the preparation chamber via the second inlet only.

15. A dispensing assembly for a machine for the preparation of liquid food products, comprising a preparation chamber and a hydraulic circuit configured for supplying water to the preparation chamber, the hydraulic circuit comprising a water delivery duct having a duct inlet and a duct outlet, wherein the preparation chamber is configured for receiving at least one dose of a precursor of a liquid food product and for dispensing the liquid food product following upon passage of water through the preparation chamber, wherein the preparation chamber comprises a first chamber part and a second chamber part operable to define a receiving volume therebetween, at least one chamber part being displaceable relative to the other chamber part between a spaced-apart position, to enable loading of said dose into the receiving volume, and a closed position, to enable introduction of water into the receiving volume and dispensing of a liquid food product therefrom, wherein the dispensing assembly further comprises a pneumatic circuit configured for supplying compressed air to the preparation chamber for purging the receiving volume, the pneumatic circuit comprising an air delivery duct having a duct inlet and a duct outlet, wherein the dispensing assembly further comprises a double-acting pump having a cylinder and a piston, which is displaceably mounted in the cylinder so as to define therein a first variable-volume chamber for water and a second variable-volume chamber for air, wherein the first variable-volume chamber has a water inlet in fluid communication with a water-intake point, and a water outlet in fluid communication with the duct inlet of the water-delivery duct, and wherein the second variable-volume chamber has an air inlet in fluid communication with an air-intake point, and an air outlet in fluid communication with the duct inlet of the air delivery duct.

16. A dispensing assembly for a machine for the preparation of liquid food products, comprising a preparation chamber and a hydraulic circuit configured for supplying water to the preparation chamber, the hydraulic circuit comprising a water duct having a duct inlet and a duct outlet, the duct inlet of the water duct being in fluid communication with a water source, wherein the preparation chamber is configured for receiving at least one dose of a precursor of a liquid food product and for dispensing the liquid food product following upon passage of water through the preparation chamber, wherein the preparation chamber comprises a first chamber part and a second chamber part operable to define a receiving volume therebetween, at least one chamber part being displaceable relative to the other chamber part between a spaced-apart position, to enable loading of said dose into the receiving volume, and a closed position, to enable introduction of water into the receiving volume and dispensing of a liquid food product therefrom, wherein the dispensing assembly also comprises a pneumatic circuit configured for supplying compressed air to the preparation chamber for purging the receiving volume, the pneumatic circuit comprising an air duct having a duct inlet and a duct outlet, the duct inlet of the air duct being in fluid communication with a source of compressed air, wherein the hydraulic circuit and the pneumatic circuit are operable for supplying compressed air to the preparation chamber after supply of water to the preparation chamber, wherein the pneumatic circuit comprises an air pump, a first controllable valve and a second controllable valve both set on the air duct, the second controllable valve being set on the air duct downstream of the first controllable valve, the first controllable valve and the second controllable valve delimiting in the air duct a plenum space for air, and wherein the pneumatic circuit is also operable for:
  causing opening of the first controllable valve while keeping the second controllable valve closed, with the air pump active;
  subsequently causing closing of the first controllable valve for storing compressed air in the plenum space; and
  subsequently causing opening of the second controllable valve in order to cause outflow of the compressed air from the plenum space.

17. The dispensing assembly according to claim 16, wherein the hydraulic circuit comprise a water pump, wherein the water pump of the hydraulic circuit and the air pump of the pneumatic circuit are integrated in one and the same double-acting pump, and wherein the first controllable valve and the second controllable valve are operable in order to store the compressed air in the plenum space while the water pump integrated in the double-acting pump is active for forcing water to the preparation chamber.

* * * * *